United States Patent
Taniguchi

[11] Patent Number: 6,110,605
[45] Date of Patent: Aug. 29, 2000

[54] CERAMIC-METAL JOINTED MEMBER

[75] Inventor: Masato Taniguchi, Nagoya, Japan

[73] Assignee: NGK Spark Plug Co., Ltd., Nagoya, Japan

[21] Appl. No.: 08/920,867

[22] Filed: Aug. 29, 1997

[30] Foreign Application Priority Data

Aug. 30, 1996 [JP] Japan ................................. 8-249232
Aug. 22, 1997 [JP] Japan ................................. 9-242051

[51] Int. Cl.[7] .................................................. B32B 15/04
[52] U.S. Cl. ............................................ 428/627; 428/621
[58] Field of Search ....................... 228/124.5; 420/492, 420/490; 428/621, 627, 632, 633

[56] References Cited

U.S. PATENT DOCUMENTS

| | | | |
|---|---|---|---|
| 4,426,033 | 1/1984 | Mizuhara | 228/56 |
| 4,703,884 | 11/1987 | Landingham et al. | 228/122 |
| 4,901,904 | 2/1990 | Tsuno | 228/56.3 |
| 4,902,358 | 2/1990 | Napier et al. | 148/127 |
| 5,076,863 | 12/1991 | Taniguti et al. | 148/127 |
| 5,392,982 | 2/1995 | Li | 228/124.5 |

FOREIGN PATENT DOCUMENTS 2-199073  8/1990  Japan .

*Primary Examiner*—Timothy Speer
*Assistant Examiner*—Bryant Young
*Attorney, Agent, or Firm*—Morgan, Lewis & Bockius LLP

[57] ABSTRACT

A jointed member, such as a tappet, obtained by brazing a disc which is ceramic member, and a tappet body which is a metal member, to each other by a brazing layer, the jointed member includes a reaction layer formed on the surface of the metal member adjacent to the brazing material and having a thickness of not less than 5 μm, wherein the reaction layer contains, in addition to main elements forming the metal member, Cu in the range of 0.5 weight % to 8 weight % and Si in the range of 0.5 weight % to 8 weight %.

10 Claims, 6 Drawing Sheets

Ti

Cu

Si

Al

Fe ized to realize satisfactory reactivity with the ceramic portion, fatigue and separation between the ceramic and the brazing material does not easily take place. However, the foregoing rise in the temperature sometimes results in deterioration, such as separation, between the metal member and the brazing material when the product is used.

CERAMIC-METAL JOINTED MEMBER

BACKGROUND OF THE INVENTION

1. Field of the Invention

The present invention relates to a brazed jointed member, such as a ceramic-metal jointed member, and more particularly to a ceramic-metal jointed for use in a tappet for an engine, an engine part such as a valve lifter, a tool such as a cutting tool and an electronic part.

2. Description of the Related Art

Conventionally, an active brazing method using an active brazing material has been employed as one of methods of joining a ceramic member and a metal member. A jointed member manufacturing by using the foregoing method has been used as a rotor for a ceramic turbo charger, a ceramic tappet and the like. The active brazing method is a method for joining the ceramic member and the metal member by the active brazing material including the active metal (Ti, Zr, etc.). The active brazing method is a method which has an object to improve the strength between the brazing material and the ceramic member. In the method, a reaction layer (a diffusion layer) is formed between the brazing material and the ceramic member so that the brazing material and the ceramic member are strongly joined together. As a result, the ceramic member and the metal member can be strongly joined together.

Among the active brazing materials, a brazing material made of an In-Cu-Ag-Ti alloy and having a low melting point (the solid phase temperature: 600° C. to 750° C.) has been used to join up members, such as sliding parts for an automobile. A method using the brazing material is capable of reducing, to a minimum, the difference in the shrinkage (the thermal strain) occurring attributable to the difference between the thermal expansion of a ceramic member and that of a metal member. For example, a technique of directly brazing $Si_3N_4$ and Ni-Cr-Mo steel (JIS SNCM630) by using an In-Cu-Ag-Ti alloy brazing material has been disclosed as a technique for manufacturing, for example, tappets, rocker arms or valve bridges (refer to Unexamined Japanese Patent Publication (kokai) No. 2-199073). In addition to the foregoing brazing material having the low melting point, a technique for manufacturing the foregoing sliding parts by using a brazing material (the solid temperature: 900° C. or higher) among the active brazing materials has been put into practical use.

Although the above-mentioned brazing materials have been administered as the brazing materials, the jointed member has not satisfactorily been manufactured.

In addition, the jointed member joined by using the conventional brazing material has sufficient initial strength against tensile stress, compression stress and torsion stress. In addition to the above-mentioned simple stresses, practical products using the jointed member are exposed to severe conditions, such as thermal stress which is generated by to the difference between the thermal expansions of members occurring after the temperature has been changed, and fatigue due to use for a long time. Therefore, the jointed member using the conventional brazing material is sometimes unsatisfactory.

In a case of a tappet for an internal combustion engine consisting of a cam having a sliding surface formed by a ceramic member, the temperature of a joint portion including the ceramic member, the metal member (the body of the engine tappet) and the brazing material is raised to about 200° C. because of heat generated during the sliding operation and engine oil. The rise in the temperature causes thermal stress to be generated due to the difference in the thermal expansion between the ceramic member (for example, $Si_3N_4$) and the metal member. As a result, the proof stress of the brazing material deteriorates. Moreover, fatigue (fatigue of the brazing material) takes place after use for a long time. Since the brazing material is arranged to realize satisfactory reactivity with the ceramic portion, fatigue and separation between the ceramic and the brazing material does not easily take place. However, the foregoing rise in the temperature sometimes results in deterioration, such as separation, between the metal member and the brazing material when the product is used.

Since the adhesive strength between the metal member and the brazing material depends upon the degree of the wettability of the joint surface on the metal member, one might employ a method of improving the wettability to prevent separation of the metal member and the brazing material from each other. However, the foregoing method by itself does not satisfactorily increase and adhesive strength.

SUMMARY OF THE INVENTION

It is an object of the present invention to provide a ceramic-metal jointed member having satisfactory joint strength capable of preventing separation between a metal member and a brazing material even if thermal stress or the like takes place in the joint between attributable to the difference in the thermal expansion between members.

A ceramic-metal jointed member according to the present invention comprises: a ceramic member; a metal member; and a brazing layer which brazes the ceramic member and the metal member to each other; wherein the metal member includes a reaction layer in the side of the brazing layer having a thickness of not less than 5 μm, said reaction layer including Cu in the range of 0.5 to 8 weight % and Si in the range of 0.5 to 8 weight %.

In the above ceramic-metal jointed member, even if heat stress at the joint portion is generated due to the heat expansion difference between the metal and ceramic members, it is possible to provide a ceramic-metal jointed member having high joint strength which can prevent the separation between the metal member and the brazing material.

A ceramic-metal jointed member according to the present invention comprises a ceramic member, a metal member and a brazing layer which brazes the ceramic member and the metal member each other, the brazing layer containing Si and Ti; wherein Si and Ti of the brazing layer and Fe eluted from the metal member are segregated at a substantially same position in the brazing layer, and the segregation portion exists in a half portion of the brazing layer in the side of the metal member.

In the above ceramic-metal jointed member, the function of Si, Ti and Fe can sufficiently exhibit, so that it is possible to improve the wettability of the brazing material with the metal member and the ceramic member and to improve the strength of the brazing layer by preventing the plastic flow of Cu.

A method for producing a ceramic-metal jointed member comprises the steps of: placing a brazing material between a ceramic member and a metal member; heating the brazing material, the ceramic member and the metal member so that the ceramic member and the metal member are joined via brazing material and a reaction layer is formed in the metal member adjacent to the brazing material to form a ceramic-metal jointed member; and cooling the ceramic-metal jointed member; wherein said reaction layer includes Cu in the range of 0.5 to 8 weight % and Si in the range of 0.5 to 8 weight %.

It is possible to obtain the ceramic-metal jointed member according to the present invention by the above method.

BRIEF DESCRIPTION OF THE DRAWINGS

In the accompanying drawings:

FIGS. 6A and 6B show a method of an experiment for the example, in which FIG. 6A is a view for explaining the method and FIG. 6B is a graph showing the change in the temperature of the joint portion.

DETAILED DESCRIPTION OF THE INVENTION

Detailed description of the present invention will be described referring to the accompanying drawings as follows.

According to the present invention, in a ceramic-metal jointed member obtained by brazing a ceramic member and a metal member to each other by a brazing layer, a reaction layer is formed on the surface of the metal member adjacent to the brazing material and having a thickness of not less than 5 μm, and the reaction layer contains, in addition to main elements forming the metal member, Cu in the range of 0.5 weight % to 8 weight % and Si in the range of 0.5 weight % to 8 weight %.

The ceramic member is exemplified by $Si_3N_4$, $Al_2O_3$, SiC, AlN and $ZrO_2$, while the metal member is exemplified by carbon steel for machine structural use, such as Japanese Industrial Standard (JIS) S45C and JIS S50C; alloy steel, such as JIS SCr440, JIS SNC815, JIS SCM435, JIS SNCM 420, SNCM 439, SNCM 447 and JIS SNCM630; stainless steel; tool steel; and cored steel. The specific composition of the metal members are described in Table 1B described below.

The brazing material for forming the brazing layer is exemplified by Cu-Si-Al-ti type-, Cu-Si type-, Cu-Si-Ti type- and Cu-Si-Pd-Ti type-brazing materials.

A preferred range for Cu of the brazing material is 2 weight % to 6 weight %, while a preferred range for Si is 2 weight % to 6 weight %.

Figure 5:
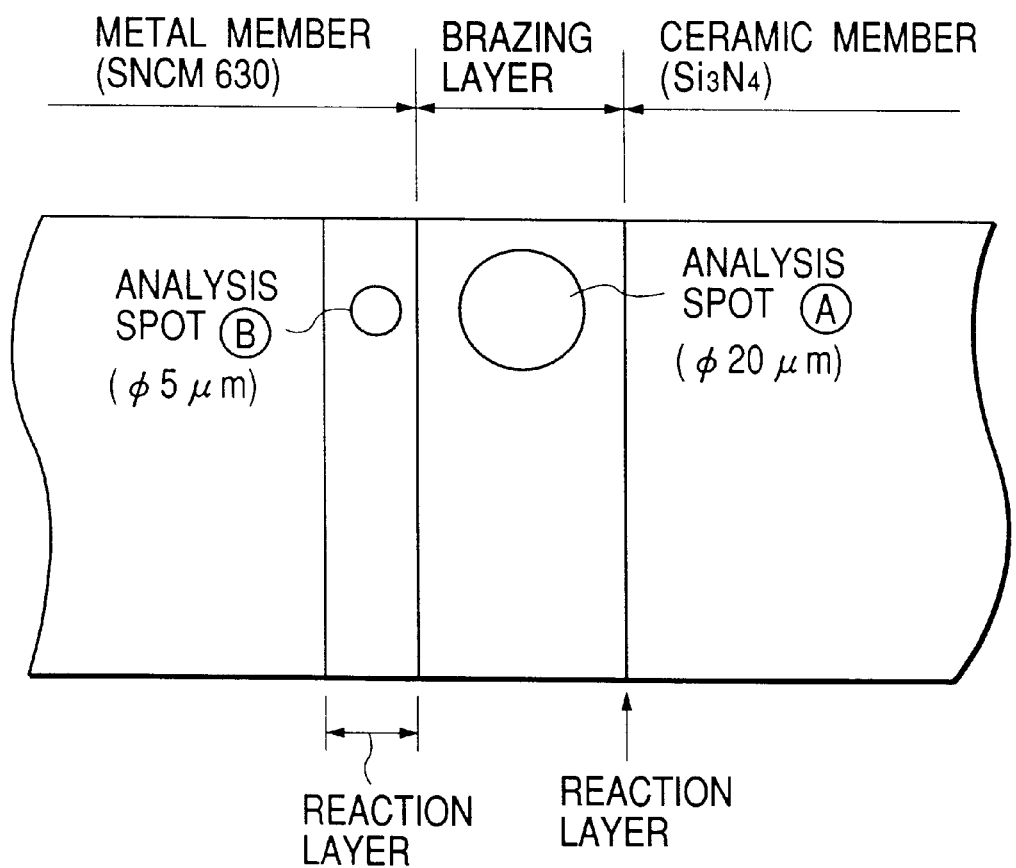
FIG. 5 is a diagram showing a joint portion of the tappet according to the embodiment and a method of analyzing the composition of the joint portion.

The above-mentioned reaction layer is, as shown in FIG. 5, a layer (having a thickness of, for example 10 μm to 20 μm) formed due to diffusion of components, such as the brazing material, for use to perform joining, in the metal member. When the cross section of the reaction layer is observed by, for example, EPMA, and by analyzing element distribution, the reaction layer and another portion of the base metal can clearly be distinguished from each other. Incidentally, another reaction layer (for example, the thickness is less than 3 μm) may be formed between the brazing material and the ceramic member which is formed by diffusing the components of the brazing material into the ceramic member.

In addition, it is preferable that the brazing layer contains, as a main component thereof, not less than 90 weight % of Cu and contains at least Ti, Fe and Si.

Further, according to the present invention, the jointed member is used as a tappet for an integral combustion engine obtained by brazing a silicon nitride plate and a steel body each other.

Moreover, Si and Ti of the brazing material component and Fe eluted from the metal member are segregated at a substantially same position in the brazing layer, and the segregation portion exists in a half portion of the brazing layer in the side of the metal member.

The composition (weight %) in the present invention is allowed so that the average composition of the overall reaction layer satisfies the above-mentioned range. Accordingly, for example, in order to measure the composition in the reaction layer by the wavelength dispersive type electronic spectral analysis (WDS), the measurement spot should be selected so that the average composition can be obtained.

Therefore, if this condition is satisfied, the measurement spots can be optionally selected. For example, the diameter of the spot (normally, the diameter of a circular spot) is set to be slightly smaller than the thickness of the reaction layer. However, the diameter of the spot is set to be in the range of 30 to 90%, preferably 60 to 90%, of the thickness of the reaction layer. The number of spots for use in the measurement may be, for example, 1 to 50, preferably, 10 to 20.

According to the present invention, at least Cu and Si components of the brazing material are diffused in the metal member (the base metal or matrix metal) so as to form the reaction layer. As a result, the adhesion between the brazing layer and the metal member can be strengthened. Even if, for example, thermal stress is generated attributable to the difference in the thermal expansion, separation and the like cannot easily take place.

In the present invention, since the thickness of the reaction layer is sufficient, i.e. not less than 5 μm, the reaction layer can serve as a buffer when the thermal expansion difference exists between the metal member and the ceramic member. Incidentally, the thickness of the reaction layer is in the range of 5 to 50 μm in the present invention for practical use. Since the thickness of the reaction layer according to the present invention is not less than 5 μm, it acts as a buffer in the case of any existing heat expansion difference. On the other hand, if the thickness of the reaction layer is too thick, the mechanical property of the metal member is damaged. Accordingly, the thickness of the reaction layer is not more than 50 μm in the present invention.

Since the effect of the present invention capable of increasing joint strength (prevention of separation) is mainly obtained as a result of experiments, the functions of the respective components have not been sufficiently clarified. The probable effects of respective elements will now be described.

<Cu>

Since Cu can easily be plastically deformed, it has a great buffering effect. Therefore, if Cu is contained in the reaction layer in an amount of not less than 0.5 weight %, thermal stress is generated due to, for example, the difference in the thermal expansion. Thus, the thermal stress can be buffered and a consideration can be made that Cu contributes to an improvement in the joint strength. If the quantity of Cu is larger than 8 weight %, the mechanical strength of the matrix decreased. Therefore, it is considered that the quantity must be not more than 8 weight %.

<Si>

If Si is contained in the reaction layer in an amount of not less than 0.5 weight %, heat resistance can be strengthened and also the mechanical strength can be increased. If the quantity of Si is larger than 8 weight %, it is considered undesirable because the matrix will to be brittle.

As for the thickness of the reaction layer, the thickness is preferably 5 µm or larger because a satisfactory effect cannot be obtained from the above-mentioned composition of the reaction layer if the thickness of the reaction layer is smaller than 5 µm. Further, the thickness of the reaction layer may be 50 µm for practical use.

According to the present invention, the brazing layer contains Cu in an amount of not less than 90 weight % as the main component thereof and also contains Ti, Fe and Si. Accordingly, the joint strength between the ceramic member and the metal member can be increased. The effects of elements in the brazing material layer will now be described.

<Cu>

Since Cu improves the fluidity of the brazing material and has excellent wettability and easily plastically deformable characteristics, a great buffering effect can be attained and thus Cu is suitable as a component of the brazing material. Therefore, it is preferable that Cu is contained in the brazing material layer in an amount of not less than 90 weight %.

<Si>

Si is able to improve the wettability with metal. If the quantity of Si is too large, the ductility deteriorates when the brazing material is prepared. Therefore, it is preferable that the quantity of Si in the brazing material layer is in the range from 0.1 weight % to 5 weight %.

<Ti>

Ti mainly improves the wettability with ceramic and most significantly contributes to strengthening the joining of ceramic. If the quantity of Ti is too large, the hardness in the brazing material layer is raised, thus causing the brazing material layer to be made to be undesirably brittle. Therefore, it is preferable that the quantity is in the range from 0.1 weight % to 5 weight %.

<Fe>

Fe eluted from the matrix has an effect of preventing plastic flow of the soft Cu in the brazing material layer. Therefore, the strength of the brazing material layer can be increased. Therefore, it is preferable that the quantity of Fe is in the range from 0.1 weight % to 5 weight %.

According to the present invention, if the ceramic-metal jointed member is used as a tappet for an internal combustion engine obtained by brazing a silicon nitride ceramic plate and a steel body each other, it is possible to increase the joint strength. Even if thermal stress is generated owning to, for example, thermal expansion, separation and the like between the metal member and the brazing material layer can be prevented.

Moreover, according to the present invention, Si and Ti of the brazing material component and Fe eluted from the metal member are segregated at a substantially same position in the brazing layer, and the segregation portion exists in a half portion of the brazing layer in the side of the metal member. Accordingly, the effect of Si, Ti and Fe can be sufficiently exhibited. Therefore, the wettability with respect to the metal and the ceramic can be improved, and it is possible to prevent the plastic flow to thereby improve the strength of the brazing material.

EXAMPLES

Examples of the ceramic-metal jointed member according to the present invention will now be described.

In this example, the ceramic-metal jointed member according to the present invention is applied to a tappet for use to operate a suction valve or an exhaust valve of an internal combustion engine.

(1) A method of manufacturing the tappet will now be described.

Figure 1:
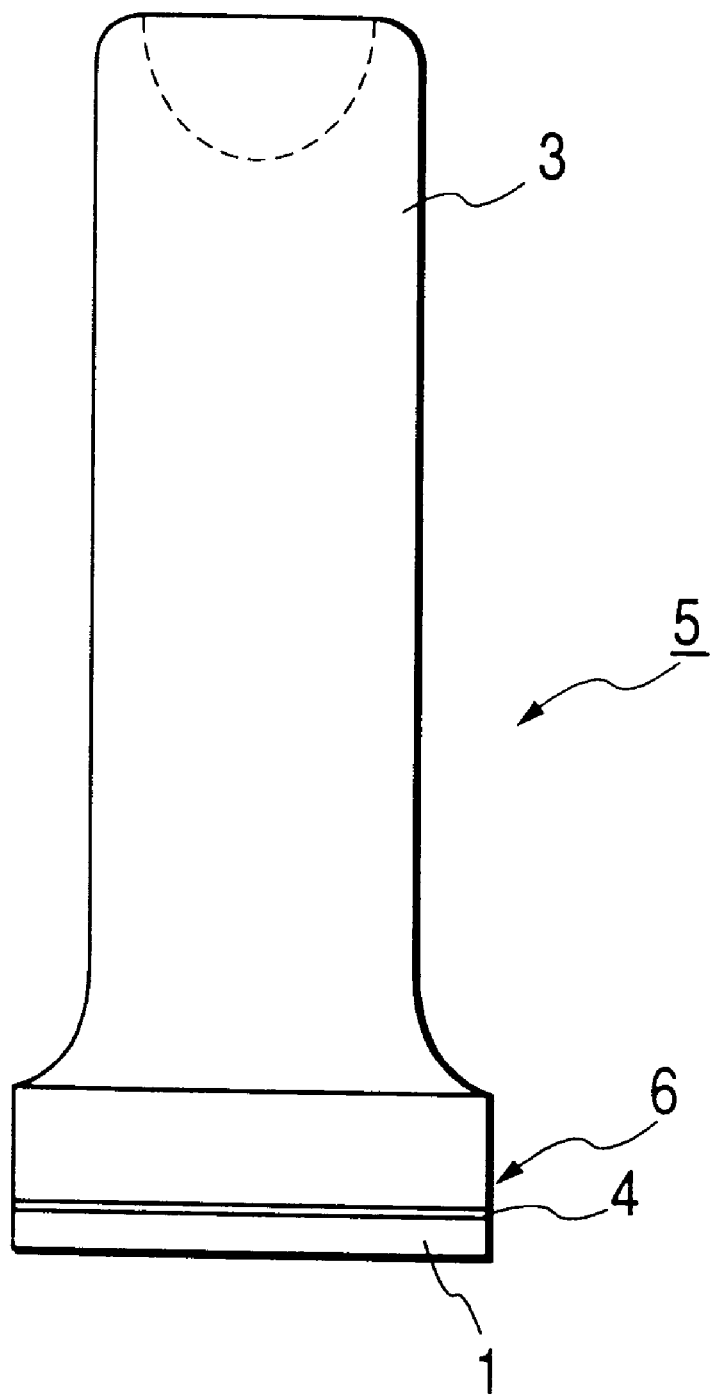
FIG. 1 is a cross sectional view showing a tappet according to an embodiment of the present invention.

As shown in FIG. 1, both surfaces of a sintered $Si_3N_4$ material which was molded to have disc-like shape and sintered was ground (polished). Thus, a disc 1 having a diameter of 30 mm and a thickness of 2 mm was prepared as a ceramic member.

On the other hand, as a metal member, a rod steel member made of JIS SNCM 630 was cut to prepare a tappet body 3 having a height of 78 mm, a diameter in the side of a joint surface of 30 mm, and a diameter in the side of a shaft of 20 mm.

The brazing material (refer to, for example, the following Table 1B) having the diameter of 30 mm and the thickness of 0.05 mm was placed between the joint surface of the tappet body 3 and the disc 1. Then, in a vacuum, the level of which was $10^{-4}$ Torr to $10^{-5}$ Torr, it was heated to temperatures at which the brazing material was melted, and then cooled. Thus, the tappet body 3 and the disc 1 were brazed each other so that a tappet 5 was prepared.

In this brazing process, the brazing material is melted to be a brazing layer 4, and the reaction layer 6 is formed in the end surface of the tappet body 3 in the side of the brazing layer 4.

Table 1A shows types of the tappet body (metal member), the disc (ceramic member) and brazing material employed in this example and conditions of heat treatment to which materials were subjected together with those according to comparative examples.

In Table 1A, Sample Nos. 1 to 13 are Examples according to the present invention and Sample Nos. 14 to 25 are Comparative Examples. Metal members described in Table 1A are defined by the Japanese Industrial Standard (JIS). Specific chemical compositions are exhibited in Table 1B.

TABLE 1A

| Sample No. | Metal Member | Ceramic Member | Composition of Brazing Material | | | | | | | | | Brazing Condition [° C.] × [h] |
|---|---|---|---|---|---|---|---|---|---|---|---|---|
| | | | Cu | Ag | Si | Al | In | Pd | Ti | Ni | Cr | |
| 1 | SNCM630 | Si₃N₄ | 92 | — | 3 | 2 | — | — | 3 | — | — | 1060 × 1 |
| 2 | SNCM630 | Si₃N₄ | 93.5 | — | 3.5 | 1 | — | — | 2 | — | — | 1060 × 1.5 |
| 3 | SNCM630 | Si₃N₄ | 91 | — | 1 | 1 | — | — | 4 | — | — | 1060 × 1 |
| 4 | SNCM439 | Si₃N₄ | 92 | — | 1 | — | — | 2 | 2 | — | — | 1060 × 1 |
| 5 | SNCM439 | Si₃N₄ | 90 | — | 3 | — | — | 3 | 4 | — | — | 1060 × 1.5 |
| 6 | SNCM447 | Si₃N₄ | 84 | — | 3 | — | — | 9 | 2 | — | — | 1070 × 0.5 |
| 7 | SNCM447 | Si₃N₄ | 95 | — | 3 | — | — | — | 2 | — | — | 1060 × 1 |
| 8 | SNCM420 | Si₃N₄ | 98 | — | 2 | — | — | — | — | — | — | 1070 × 0.5 |
| 9 | SCM435 | Si₃N₄ | 90 | — | 5 | — | — | — | 5 | — | — | 1060 × 2.5 |
| 10 | B50C | ZrO₂ | 93 | — | 2 | — | — | — | 3 | — | — | 1060 × 2.5 |
| 11 | SNCM439 | Si₃N₄ | 90.5 | — | 3.5 | — | — | 2.5 | 3.5 | — | — | 1075 × 4 |
| 12 | SNCM439 | Si₃N₄ | 90.5 | — | 3.5 | — | — | 2.5 | 3.5 | — | — | 1075 × 4 |
| 13 | SNCM439 | Si₃N₄ | 90.5 | — | 3.5 | — | — | 2.5 | 3.5 | — | — | 1075 × 4 |
| 14 | SNCM690 | Si₃N₄ | 27 | 59 | — | — | 13 | — | 1.5 | 0.5 | — | 770 × 1.5 |
| 15 | SNCM630 | Si₃N₄ | 24.5 | 60 | 1 | — | 13 | — | 1.5 | — | — | 800 × 1 |
| 16 | SNCM439 | Si₃N₄ | 35 | 65 | — | — | — | — | 2 | — | — | 830 × 1 |
| 17 | SNCM439 | Si₃N₄ | 77 | 20 | 1 | — | — | — | 2 | — | — | 850 × 1.3 |
| 18 | SNCM447 | Si₃N₄ | 5 | 92 | — | 1 | — | — | 2 | — | — | 950 × 1 |
| 19 | SNCM447 | Si₃N₄ | 15 | — | — | — | — | — | 70 | 15 | — | 1000 × 1 |
| 20 | SNCM420 | Si₃N₄ | — | — | 2 | — | — | 36 | 2 | 49 | 11 | 1050 × 1 |
| 21 | SNCM439 | Si₃N₄ | — | 88 | — | — | — | 9.5 | 2.5 | — | — | 1080 × 1 |
| 22 | SNCM435 | Si₃N₄ | 88 | — | 7 | — | — | — | 5 | — | — | 1080 × 1 |
| 23 | SNCM447 | Si₃N₄ | 97.5 | — | 0.5 | — | — | — | 2 | — | — | 1090 × 1.5 |
| 24 | SNCM439 | Si₃N₄ | 95 | — | — | — | — | — | 5 | — | — | 1100 × 1 |
| 25 | SNCM630 | Si₃N₄ | — | — | 10 | — | — | — | 2 | 69 | 19 | 1150 × 1 |

TABLE 1B

| Metal Members | C | Si | Mn | P | S | Ni | Cr | Mn |
|---|---|---|---|---|---|---|---|---|
| (*1)SNCM420 | 0.17–0.23 | 0.15–0.35 | 0.40–0.70 | less than 0.030 | less than 0.030 | 1.60–2.00 | 0.40–0.65 | 0.15–0.30 |
| (*1)SNCM439 | 0.36–0.43 | 0.15–0.35 | 0.60–0.90 | less than 0.030 | less than 0.030 | 1.60–2.00 | 0.60–1.00 | 0.15–0.30 |
| (*1)SNCM447 | 0.44–0.50 | 0.15–0.35 | 0.60–0.90 | less than 0.030 | less than 0.030 | 1.60–2.00 | 0.60–1.00 | 0.15–0.30 |
| (*1)SNCM630 | 0.25–0.35 | 0.15–0.35 | 0.55–0.60 | less than 0.030 | less than 0.030 | 2.50–3.50 | 2.50–3.50 | 0.50–0.70 |
| (*2)SCM435 | 0.33–0.38 | 0.13–0.35 | 0.60–0.83 | less than 0.030 | less than 0.030 | — | 0.90–1.20 | 0.15–0.30 |
| (*3)S50C | 0.47–0.53 | 0.15–0.35 | 0.60–0.90 | less than 0.030 | less than 0.035 | — | — | — |
| (*3)S45C | 0.42–0.48 | 0.15–0.35 | 0.60–0.90 | less than 0.030 | less than 0.035 | — | — | — |
| (*1)SMC815 | 0.12–0.18 | 0.15–0.35 | 0.35–0.65 | less than 0.030 | less than 0.030 | 3.00–3.50 | 0.70–1.00 | — |
| (*2)SCr440 | 0.38–0.43 | 0.15–0.35 | 0.60–0.85 | less than 0.030 | less than 0.030 | — | 0.90–1.20 | — |

(*1) Metal material should not contain Cu of more than 0.30% as an impurity.
(*2) Metal material should not contain Ni of more than 0.25% and Cu of more than 0.30% as impurities.
(*3) Metal material should not contain Cu of more than 0.30%, Ni of more than 0.20%, Cr of more than 0.20% and Ni + Cr or more than 0.35%.

Sample No. 8 shown in Table 1A was produced by sequentially sputtering Ti having a thickness of 0.3 μm, Mo having a thickness of 0.5 μm and Cu having a thickness of 0.5 μm on a disc (ceramic member).

(2) Next, the method of analyzing the composition of the joint portion of the tappet 5 will now be described.

Figure 2:
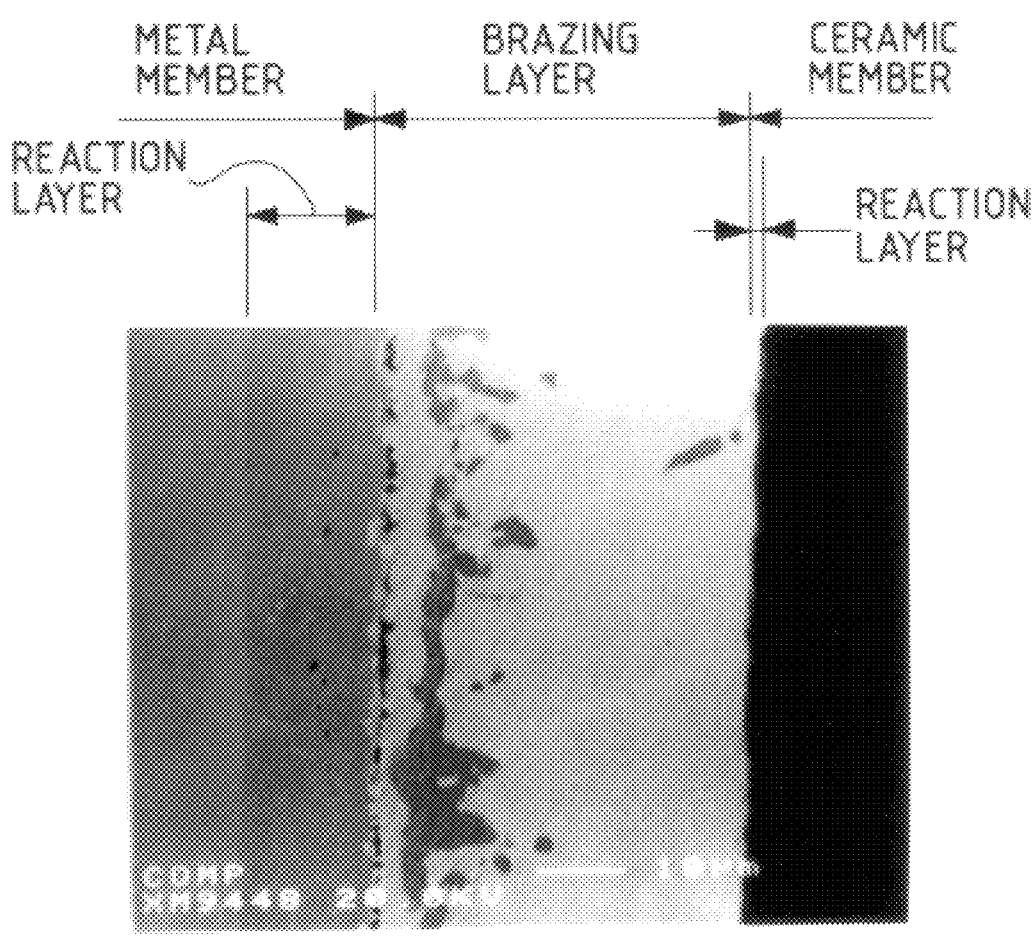
FIG. 2 is a photograph showing the metallographic structure of the tappet according to the embodiment of FIG. 1 obtained by the scanning electron microscope (SEM)

Among the manufactured tappets 5, tappets 5 made of, for example, Cu-Al-Si-Ti as the brazing material were cut in a direction perpendicular to the joint surface thereof. Then, the SEM-photograph of the cross section thereof was taken. A result is shown in FIG. 2. The tappet body 3 (metal member), the brazing layer and the disc 1 (ceramic member) were formed in this order from the left-hand portion of the drawing. A fact can be understood that the reaction layer (diffusion layer) was formed not only in the portion of the metal member adjacent to the brazing material layer but also in the portion of the ceramic member adjacent to the brazing material. Incidentally, the thickness of the reaction layer of the ceramic member formed adjacent to the brazing material is very small in comparative with that of the reaction layer of the metal member formed adjacent to the brazing material. Although the thickness of the reaction layer of the metal member is in the range of 5 to 50 μm, that of the reaction layer of the ceramic member is 0.1 to 3 μm.

Figure 3A:
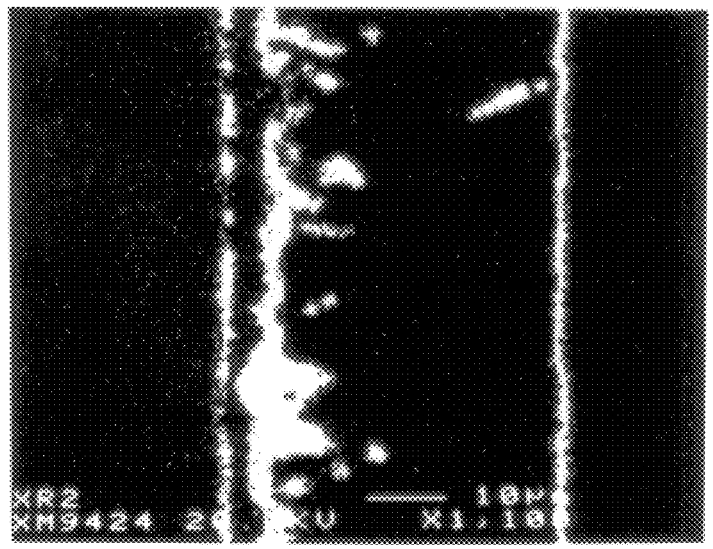
FIGS. 3A and 3B are photographs showing the metallographic structure of the tappet according to the embodiment of FIG. 1 obtained by performing analysis of element distribution by using an EPMA.
Figure 3B:
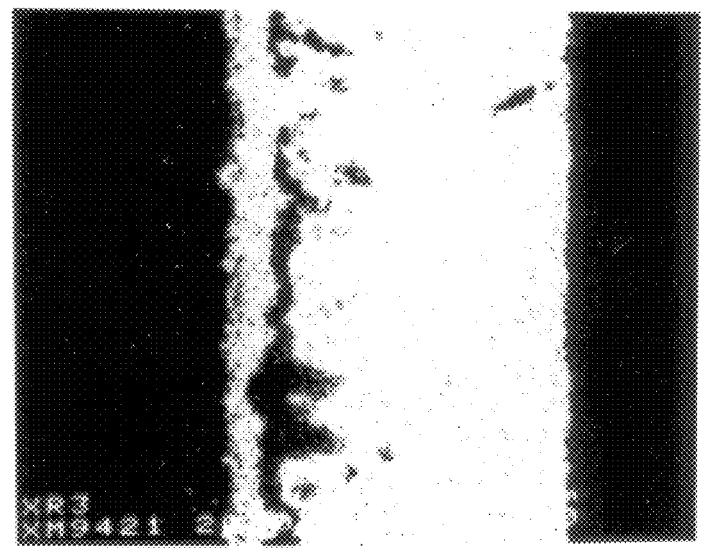
Figure 4A:
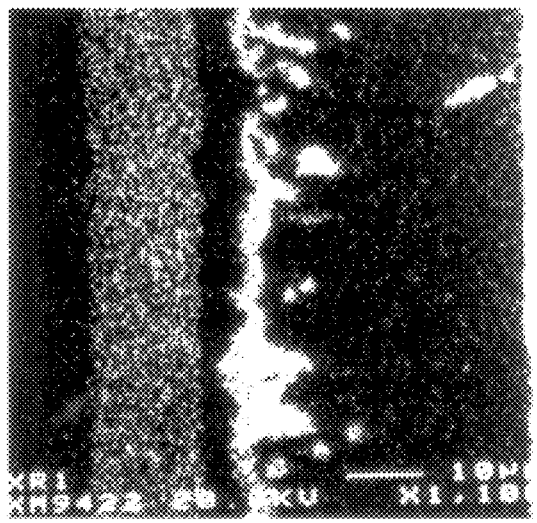
FIGS. 4A to 4C are photographs showing the metallographic structure of the tappet according to the embodiment of FIG. 1 obtained by performing analysis of element distribution by using the EPMA.
Figure 4B:
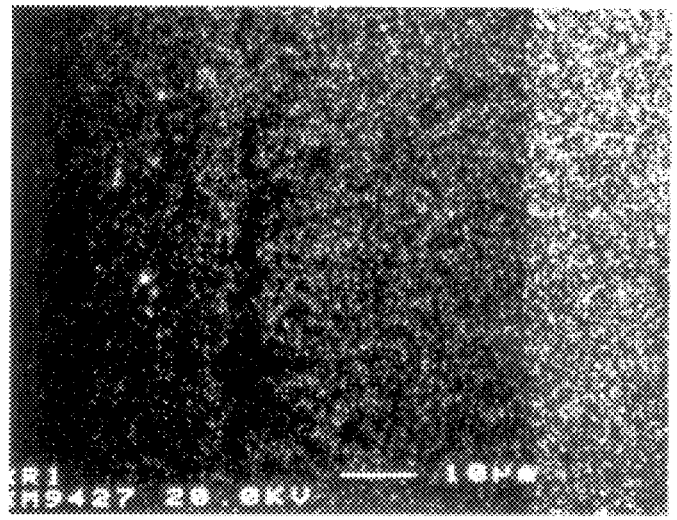
Figure 4C:
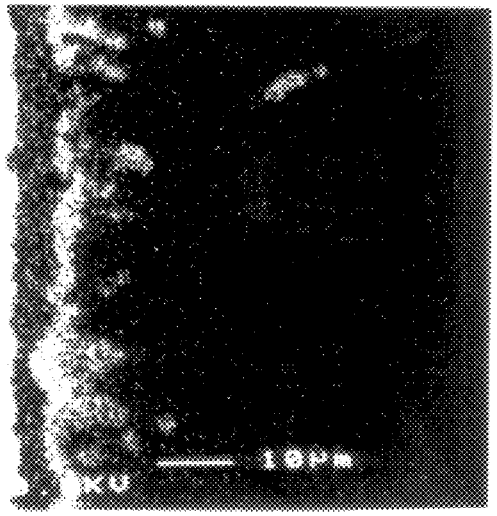

Moreover, the cross section of the joint portion was analyzed by EPMA and a state where Ti, Cu, Si, Al and Fe existed was examined. Results are shown in FIGS. 3A to 4C which are photographs of results of the EPMA analysis. Among the drawings, FIG. 3A shows a state of distribution of Ti, FIG. 3B shows a state of distribution of Cu, FIG. 4A shows a state of distribution of Si, FIG. 4B shows a state of distribution of Al, and FIG. 4C shows a state of distribution of Fe. Referring to FIGS. 3A to 4C, white portions are portions where the subject components exist.

As can be understood from FIGS. 3A to 4C, the reaction layer adjacent to the metal portion contains Cu and Si. Also Ti and Al are contained in small quantities, although the quantities are smaller than Cu and Si.

When the composition in the joint portion of the tappet 5 is analyzed, 10 arbitrary portions in the reaction layer are analyzed by WDS (wavelength dispersive type electronic spectral analysis). The above-mentioned analysis is performed for each sample shown in Table 1A. Results are, together with thickness of the reaction layer, shown in the following Tables 2 and 3.

The WDS analysis was performed in a point analysis manner in such a way that the reaction layer was measured at spots each having a diameter of 5 μm and the brazing material layer was measured at spots each having a diameter of 20 μm. Each of average values of 10 portions was employed as the composition of each layer. Although the diameter of the beam may be enlarged to the thickness of the reaction layer to make this as the diameter of the spot, it is preferable that an average value of ten or more portions (10 to 20 portions) is employed as the composition.

(3) A method of an experiment for examining the degree of joint (an evaluation method) will now be described.

EXPERIMENT 1

Figure 6A:
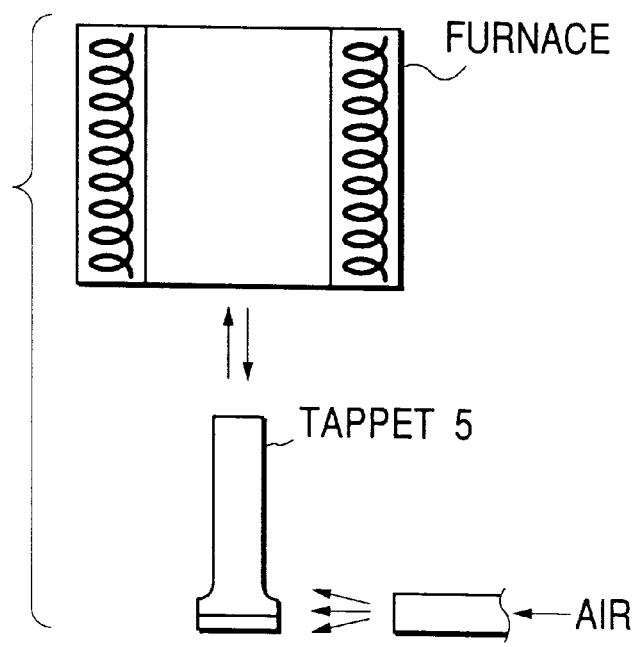

As shown in FIG. 6A, the manufactured tappet 5 was set to a thermal cycle testing machine to count the number of cycles after which the joint portion deteriorated (separated).

Figure 6B:
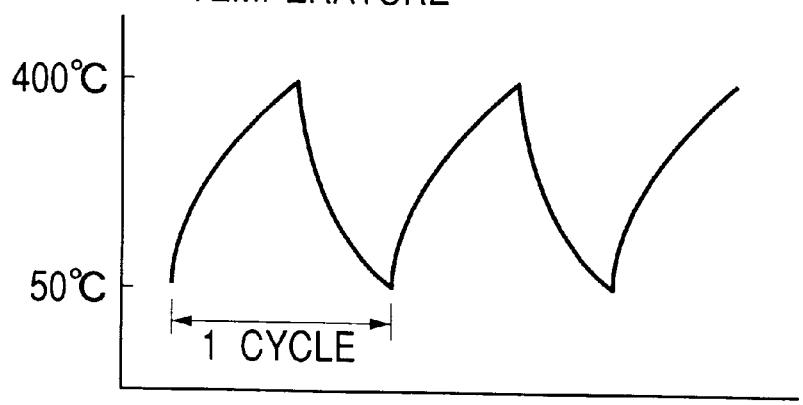

Specifically, an operation for introducing the tappet 5 into a furnace, the temperature of which was 800° C., and heated for 200 seconds and an operation for cooling it for 50 seconds by spraying air onto the joint portion of the tappet 5 after the heating operation were repeated (one heating operation and one cooling operations from one cycle). Thus, the number of cycles after which separation took place in the joint portion was measured. FIG. 6B shows change in the temperature occurring due to the heating and cooling operations. Results of experiments, to which the samples were subjected, are shown in Tables 2 and 3.

Incidentally, the difference of the reaction layer in the Tables 2 and 3 is mainly caused by the joint temperature, holding time and the material of the metal. The different compositions are caused by the difference of each component used for junction.

EXPERIMENT 2

The manufactured tappet 5 was mounted on a cam motoring tester so that the number of cycles after which the joint portion deteriorated was confirmed in a manner similar to the above-mentioned experiment.

Specifically, the revolving speed of the cam was 3000 rpm, the clearance of the tappet was 1.5 mm and a load of the spring was 350 kgf. The cam was rotated to operate the tappet so that a state of generation of separation in the joint portion in the tappet was confirmed. The number of cycles means the revolving speed of the cam. Also results of the experiments to which the samples were subjected are shown in the following Tables 2 to 3B.

It should be noted that sample numbers shown in Table 1A correspond to sample numbers shown in Tables 2 to 3B. Samples having the same number are the same samples.

TABLE 2

| Sample No. | *1 | *2 | Composition (weight %) | | | | | | | | | | | |
|---|---|---|---|---|---|---|---|---|---|---|---|---|---|---|
| | | | Cu | Ag | Si | Al | In | Pd | Ti | Fe | Ni | Cr | Mo | Others |
| 1 | A | — | 95.2 | — | 0.6 | 0.9 | — | — | 0.6 | 1.2 | 0.1 | — | — | 0.4 |
| | B | 8 | 5.1 | — | 6.1 | 0.4 | — | — | 0.1 | 83.8 | 2.0 | 1.8 | 0.4 | 0.3 |
| 2 | A | — | 96.5 | — | 0.7 | 0.7 | — | — | 0.6 | 1.1 | 0.1 | — | — | 0.3 |
| | B | 11 | 6.0 | — | 7.2 | 0.1 | — | — | 0.1 | 81.9 | 2.1 | 2.0 | 0.3 | 0.3 |
| 3 | A | — | 95.9 | — | 0.6 | 0.9 | — | — | 0.8 | 1.3 | 0.1 | — | — | 0.4 |
| | B | 10 | 5.0 | — | 6.9 | 0.2 | — | — | 0.1 | 82.4 | 2.5 | 2.2 | 0.4 | 0.5 |
| 4 | A | — | 96.3 | — | 0.8 | — | — | 0.8 | 0.7 | 0.9 | 0.1 | — | — | 0.4 |
| | B | 9 | 3.0 | — | 5.2 | — | — | 0.1 | 0.1 | 87.6 | 1.6 | 0.9 | 0.2 | 0.4 |
| 5 | A | — | 95.2 | — | 0.7 | — | — | 1.5 | 1.2 | 0.9 | 0.1 | — | — | 0.4 |
| | B | 17 | 3.8 | — | 4.1 | — | — | 0.2 | 0.1 | 88.6 | 1.5 | 1.0 | 0.3 | 0.4 |
| 6 | A | — | 94.0 | — | 1.6 | — | — | 2.7 | 0.9 | 0.2 | 0.1 | — | — | 0.3 |
| | B | 5 | 0.6 | — | 4.2 | — | — | 0.1 | 0.1 | 91.2 | 1.9 | 1.1 | 0.3 | 0.5 |
| 7 | A | — | 97.5 | — | 0.9 | — | — | — | 0.7 | 0.4 | 0.1 | — | — | 0.4 |
| | B | 11 | 2.9 | — | 4.5 | — | — | — | 0.1 | 89.3 | 1.4 | 0.9 | 0.3 | 0.4 |
| 8 | A | — | 98.6 | — | 0.4 | — | — | — | — | 0.7 | 0.1 | — | — | 0.2 |
| | B | 7 | 1.6 | — | 0.5 | — | — | — | — | 94.9 | 1.4 | 1.0 | 0.3 | 0.3 |
| 9 | A | — | 96.1 | — | 1.0 | — | — | — | 1.9 | 0.7 | — | — | — | 0.3 |
| | B | 23 | 7.9 | — | 7.8 | — | — | — | 0.2 | 83.2 | — | 0.4 | 0.1 | 0.4 |
| 10 | A | — | 95.4 | — | 0.6 | — | — | 2.2 | 0.9 | 0.3 | — | — | — | 0.6 |
| | B | 8 | 2.1 | — | 3.9 | — | — | 0.1 | 0.1 | 93.2 | — | — | — | 0.6 |
| 11 | A | — | 94.4 | — | 0.8 | — | — | 2.0 | 1.3 | 1.0 | 0.1 | — | — | 0.4 |
| | B | 50 | 3.3 | — | 7.1 | — | — | 0.1 | 0.1 | 84.3 | 1.4 | 1.0 | 0.3 | 0.4 |
| 12 | A | — | 94.2 | — | 0.5 | — | — | 2.7 | 1.2 | 0.9 | 0.1 | — | — | 0.4 |
| | B | 36 | 4.4 | — | 6.6 | — | — | 0.2 | 0.1 | 85.8 | 1.3 | 1.0 | 0.2 | 0.4 |
| 13 | A | — | 93.9 | — | 0.6 | — | — | 2.8 | 1.2 | 1.0 | 0.1 | — | — | 0.4 |
| | B | 29 | 4.1 | — | 5.8 | — | — | 0.1 | 0.1 | 87.0 | 1.2 | 1.0 | 0.3 | 0.4 |

*1: Portion of measurement (A or B as shown in FIG. 5)
*2: Thickness of reaction layer (μm)

In the above experiments 2 and 3, all of the sample Nos. 1 to 13 which are the examples according to the present invention satisfy the sufficient condition. In the experiment 2, all of the samples did not experience separation in the joint portion even if the number of cycles is $1 \times 10^4$. Further, in the experiment 3, all of the samples did not experience separation in the joint portion even if the number of cycles is $1 \times 10^4$.

TABLE 3

| *3 | *4 | *5 | Cu | Ag | Si | Al | In | Pd | Ti | Fe | Ni | Cr | Mo | *6 |
|---|---|---|---|---|---|---|---|---|---|---|---|---|---|---|
| 14 | A | — | 31.1 | 57.9 | — | — | 9.5 | — | 0.8 | — | 0.3 | — | — | 0.4 |
|    | B | 0 | — | — | — | — | — | — | 0.1 | 95.1 | 2.1 | 2.0 | 0.4 | 0.3 |
| 15 | A | — | 21.3 | 62.9 | 1.1 | — | 13.8 | — | 0.6 | — | — | — | — | 0.3 |
|    | B | 0 | — | — | — | — | — | — | 0.1 | 94.4 | 2.5 | 2.2 | 0.4 | 0.4 |
| 16 | A | — | 29.1 | 70.1 | — | — | — | — | 0.4 | — | — | — | — | 0.4 |
|    | B | 0 | — | — | — | — | — | — | 0.1 | 95.9 | 1.8 | 1.5 | 0.3 | 0.4 |
| 17 | A | — | 76.3 | 21.9 | 0.7 | — | — | — | 0.6 | — | — | — | — | 0.5 |
|    | B | 0 | — | — | — | — | — | — | 0.1 | 95.4 | 2.0 | 1.7 | 0.5 | 0.5 |
| 18 | A | — | 2.9 | 95.3 | — | 0.7 | — | — | 0.6 | — | — | — | — | 0.5 |
|    | B | 0 | — | — | — | — | — | — | 0.1 | 95.9 | 1.5 | 1.8 | 0.3 | 0.4 |
| 19 | A | — | 21.8 | — | — | — | — | — | 61.9 | — | 15.8 | — | — | 0.5 |
|    | B | 0 | — | — | — | — | — | — | 0.1 | 95.7 | 1.7 | 1.7 | 0.3 | 0.5 |
| 20 | A | — | — | — | 1.3 | — | — | 34.1 | 0.8 | — | 54.1 | 9.5 | — | 0.2 |
|    | B | 2 | — | — | 0.4 | — | — | 0.1 | 0.1 | 95.2 | 1.8 | 1.9 | 0.2 | 0.3 |
| 21 | A | — | — | 87.0 | — | — | — | 12.1 | 1.0 | — | — | — | — | 0.5 |
|    | B | 0 | — | — | — | — | — | — | 0.1 | 96.2 | 1.9 | 1.5 | 0.3 | 0.4 |
| 22 | A | — | 92.7 | — | 0.8 | — | — | — | 1.8 | 4.4 | — | — | — | 0.3 |
|    | B | 17 | 8.3 | — | 8.1 | — | — | — | 0.3 | 82.5 | — | 0.3 | 0.1 | 0.4 |
| 23 | A | — | 98.8 | — | 0.1 | — | — | — | 0.4 | 0.2 | — | — | — | 0.5 |
|    | B | 4 | 1.3 | — | 0.4 | — | — | — | 0.1 | 93.4 | 2.1 | 2.0 | 0.3 | 0.4 |
| 24 | A | — | 97.4 | — | — | — | — | — | 2.2 | — | — | — | — | 0.4 |
|    | B | 2 | 0.4 | — | — | — | — | — | 0.1 | 95.3 | 1.6 | 1.9 | 0.3 | 0.4 |
| 25 | A | — | — | — | 9.8 | — | — | — | 0.8 | — | 72.1 | 17.0 | — | 0.3 |
|    | B | 0 | — | — | — | — | — | — | 0.1 | 93.6 | 2.7 | 2.8 | 0.4 | 0.4 |

*3: Sample No.
*4: Portion of measurement (A or B as shown in FIG. 5)
*5: Thickness of reaction layer (μm)
*6: Others

TABLE 3B

| Sample No. | Estimation (number of cycles) | |
|---|---|---|
|  | Experiment 1 | Experiment 2 |
| 14 | 10 NG | $2 \times 10^5$ NG |
| 15 | 10 NG | $3 \times 10^5$ NG |
| 16 | 70 NG | $8 \times 10^6$ NG |
| 17 | 250 NG | $2 \times 10^7$ NG |
| 18 | 30 NG | $4 \times 10^6$ NG |
| 19 | 590 NG | $1 \times 10^7$ NG |
| 20 | 2300 NG | $5 \times 10^7$ NG |
| 21 | 760 NG | $3 \times 10^7$ NG |
| 22 | $1 \times 10^4$ OK | $4 \times 10^7$ NG |
| 23 | 5200 NG | $1 \times 10^8$ OK |
| 24 | 3300 NG | $4 \times 10^7$ NG |
| 25 | 2800 NG | $5 \times 10^7$ Ng |

As can be understood from Tables 1A, 2, 3A and 3B, the jointed members (Sample Nos. 1 to 13) of the examples each having the reaction layer having the thickness and the composition which were in the range according to the present invention were preferable because no separation took place even after Experiments 1 and 2 were performed. On the other hand, the jointed members (Sample Nos. 14 to 25) of the comparative examples which did not satisfy the above-mentioned ranges resulted undesirable values.

The present invention is not limited to the above-mentioned examples and the present disclosure of the preferred form can be changed in the details of construction and in the combination and arrangement of parts without departing from the spirit and the scope of the invention.

(1) The reaction layer is formed because the brazing material is diffused into the metal portion as a result of the heat treatment performed by the brazing operation. Therefore, the components forming the composition of the reaction layer may previously be contained in the brazing material. As an alternative to this, a metalizing layer containing the above-mentioned components may be formed on the joint surface of the metal member by plating, evaporating or sputtering so as to be diffused and supplied into the reaction layer by the heat treatment performed by the brazing operation. That is, either method may be employed if the composition of the reaction layer formed by the brazing operation satisfies the range of the composition according to the present invention.

(2) As a method of measuring the composition of the reaction layer, for example, EPMA, EDS having a SEM or WDS may be employed.

What is claimed is:

1. A ceramic-metal jointed member comprising:

a ceramic member;

a metal member; and a brazing layer which brazes said ceramic member and said metal member to each other;

wherein said metal member includes a reaction layer adjacent to the brazing layer, said reaction layer having a thickness of not less than 5 μm and including Cu in the range of 0.5 to 8 weight % and Si in the range of 0.5 to 8 weight %, wherein said brazing layer comprises Cu in an amount of not less than 90 weight %, balance Ti, Fe and Si, and wherein Si and Ti of said brazing layer and Fe eluted from the metal member are segregated at a substantially same position in said brazing layer, and the segregation portion exists in a half portion of the brazing layer adjacent said metal member.

2. The ceramic-metal jointed member according to claim 1, wherein said jointed member is a tappet for an internal combustion engine, and said ceramic member is a silicon nitride ceramic plate and said metal member is a steel body.

3. The ceramic-metal jointed member according to claim 1, wherein the thickness of said reaction layer is in the range of 5 to 50 μm.

4. The ceramic-metal jointed member according to claim 1, wherein an amount of Ti in said brazing layer is in the range of 0.1 to 5 weight %.

5. The ceramic-metal jointed member according to claim 1, wherein an amount of Fe in said brazing layer is in the range of 0.1 to 5 weight %.

6. The ceramic-metal jointed member according to claim 1, wherein an amount of Si in said brazing layer is in the range of 0.1 to 5 weight %.

7. The ceramic-metal jointed member according to claim 1, wherein said metal member includes Cu in the range of 2 to 6 weight % and Si in the range of 2 to 6 weight %.

8. The ceramic-metal jointed member according to claim 1, wherein said ceramic member includes a reaction layer.

9. The ceramic-metal jointed member according to claim 8, wherein said reaction layer of said ceramic member has a thickness in the range of 0.1 to 3 μm.

10. The ceramic-metal jointed member according to claim 1, wherein said ceramic member includes a reaction layer having a thickness in the range of 0.1 to 3 μm.

* * * * *